US007083826B2

(12) United States Patent
Pekurovsky et al.

(10) Patent No.: US 7,083,826 B2
(45) Date of Patent: Aug. 1, 2006

(54) COATING DIE AND METHOD FOR USE

(75) Inventors: Mikhail L. Pekurovsky, Bloomington, MN (US); Joan M. Noyola, Maplewood, MN (US); Robert B. Secor, Stillwater, MN (US)

(73) Assignee: 3M innovative Properties Company, St. Paul, MN (US)

( * ) Notice: Subject to any disclaimer, the term of this patent is extended or adjusted under 35 U.S.C. 154(b) by 0 days.

(21) Appl. No.: 10/439,448

(22) Filed: May 16, 2003

(65) Prior Publication Data

US 2004/0228972 A1 Nov. 18, 2004

(51) Int. Cl.
*B05D 1/26* (2006.01)
*B29C 47/76* (2006.01)

(52) U.S. Cl. ....................... 427/356; 118/410; 425/461

(58) Field of Classification Search ................ 427/356; 425/461; 118/410

See application file for complete search history.

(56) References Cited

U.S. PATENT DOCUMENTS

| | | | | |
|---|---|---|---|---|
| 3,023,456 | A * | 3/1962 | Palfey | 425/208 |
| 3,889,633 | A | 6/1975 | Roquemore et al. | |
| 3,973,961 | A * | 8/1976 | Stroszynski | 430/129 |
| 4,491,417 | A * | 1/1985 | Hold et al. | 366/75 |
| 4,938,994 | A | 7/1990 | Choinski | |
| 5,374,312 | A | 12/1994 | Hasebe et al. | |
| 5,399,196 | A * | 3/1995 | Ichikawa et al. | 118/407 |
| 5,720,820 | A | 2/1998 | Boger et al. | |
| 6,319,316 | B1 | 11/2001 | Gibson et al. | |

FOREIGN PATENT DOCUMENTS

| | | | |
|---|---|---|---|
| JP | 10-277464 | | 10/1998 |
| JP | 11-188301 | | 7/1999 |
| WO | 96/26016 | * | 8/1996 |
| WO | WO 00/32320 | | 6/2000 |
| WO | WO 02/47893 A | | 6/2002 |

* cited by examiner

*Primary Examiner*—Katherine Bareford

(57) ABSTRACT

The invention is a die comprising a die body. The die body defines an internal cavity and an applicator slot. The cavity is in fluid communication with the applicator slot. A plurality of gas relief passages are in fluid communication with the internal cavity.

7 Claims, 3 Drawing Sheets

COATING DIE AND METHOD FOR USE

TECHNICAL FIELD

The invention relates generally to coating and/or extruding apparatus. More particularly, the present invention relates to coating and/or extruding apparatus allowing the removal of gas from the apparatus.

BACKGROUND

Coating a fluid onto a web of material is well known. Extrusion of material so as to form films is also known. Such coating and extruding can often be conveniently done using a die having a cavity communicating with an applicator slot. Liquid under pressure is introduced into the cavity, and is then extruded out of the applicator slot as a film or onto a desired substrate or as a film.

Depending on the exact result desired and circumstances surrounding the coating or extrusion, various aids and orientations of the die may be utilized. For many types of coating or extruding, it is convenient to orient the die so that the applicator slot is disposed towards the top of the die. One reason for orienting the die in this fashion is that any air (or other gas) introduced into the die during operation, or air remaining within the die after the initial introduction of liquid into the cavity of the die tends to bubble upwards towards the applicator slot. This allows air in the die cavity to be eliminated. This is desirable in that residual gas within the coating or extrusion die, acts to reduce the response time to start and stop the emission of liquid through the applicator slot. This unresponsiveness is due to the compressibility of gas, versus a cavity completely filled with incompressible (or substantially less compressible) fluid.

For some extrusion or coating applications, however, it is desirable to dispose the applicator slot towards the bottom of the die (i.e., orient the die such that the applicator slot is disposed downward). This problem is particularly common when the liquid is to be coated onto a substrate in discrete, separated patches, when die responsiveness to starting and stopping of coating is particularly important. The problem of removing residual gas from the coating die when the applicator slot is disposed towards the bottom of the die has been considered by the art. It is known, for example, that when patch coating discrete articles a bleed valve can be provided for the die chamber so that any air coming into the applicator die is bled off through the air bleed valve.

However, pockets of gas can still occur in the die cavity, which are not eliminated by the bleed valve. These pockets of gas can especially occur when the die is particularly wide. Thus, the art still requires some way to assure removal of residual gas that is more generally applicable to varied die geometries with the die oriented in various directions.

SUMMARY OF THE INVENTION

The invention is a die comprising a die body. The die body defines an internal cavity and an applicator slot. The cavity is in fluid communication with the applicator slot. A plurality of gas relief passages are in fluid communication with the internal cavity.

BRIEF DESCRIPTION OF THE DRAWING

In the several figures of the attached drawing, like parts bear like reference numerals.

It is to be understood that the above description is intended to be illustrative, and not restrictive. Various modifications and alterations of this invention will become apparent to those skilled in the art from the foregoing description without departing from the scope of this invention, and it should be understood that this invention is not to be limited to the illustrative embodiments set forth herein.

DETAILED DESCRIPTION OF ILLUSTRATIVE EMBODIMENTS OF THE INVENTION

Figure 1:
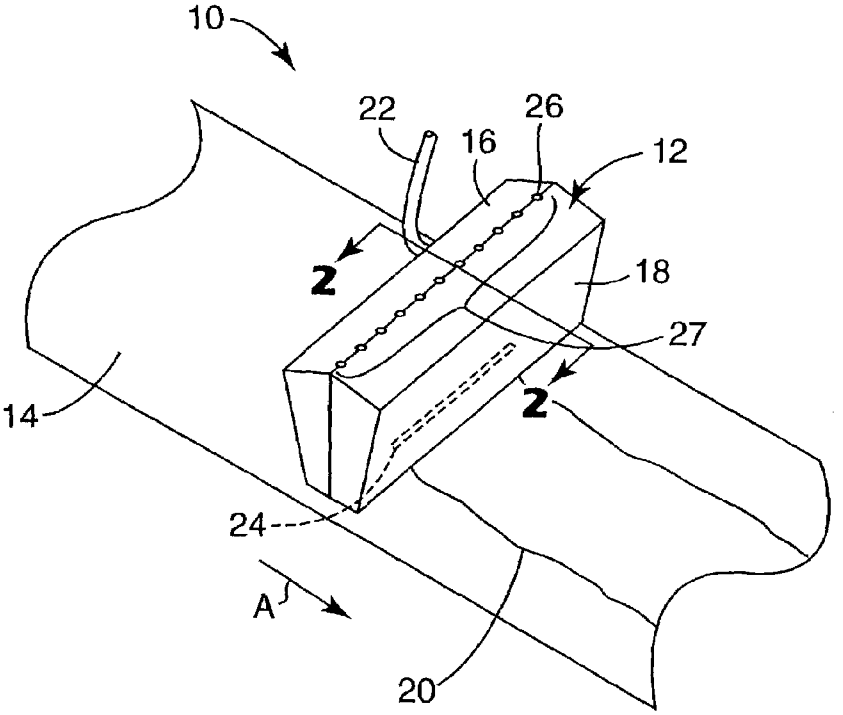
FIG. 1 is a schematic isometric view of an illustrative coating line, using a die according to the present invention.

In FIG. 1, a perspective view of an illustrative coating line 10, using die 12 according to the present invention is illustrated. While a coating application is used to describe the invention, it should be understood that the inventive die can also be used in extrusion applications. In the illustrative example, die 12 is positioned over substrate 14. In this illustration, substrate 14 is a web of indefinite length material moving in direction "A", but could be any other continuous or discrete article requiring coating. The illustrated embodiment of die 12 includes first portion 16 and second portion 18. While it is usually convenient to fabricate the inventive die as an assembly, the invention contemplates that die 12 could be constructed from multiple components or as a single element.

Material 20 being coated onto substrate 14 (e.g., any material capable of being translated out of die 12 in liquid form, such as a polymer) is introduced into die through feed pipe 22, and is seen emerging from die 12. Material is translated out of die 12 through applicator slot 24 (shown in dotted lines). Applicator slot 24 can be a continuous opening (as illustrated) or a plurality of openings (or "holes" or "passages") through which material 20 is translated for extrusion or coating purposes. It is to be noted that applicator slot 24 is oriented downwards. In other words, slot 24 is disposed below horizontal and in the illustrated embodiment is disposed in a substantially vertical downward position. In this orientation, gas 29 can become trapped in die 12 while die 12 is being filled with material 20, or during operation of the die (i.e., while extruding or coating), since gas has a tendency to migrate upwards, and thus not exit through the applicator slot 24. Controlling the translation of material 20 out of die 12 applicator slot 24 can be done in many ways, one example is by controlling the amount of material 20 introduced into die 12 by controlling a feeder pump (not shown) delivering material 20 to feed pipe 22. As discussed previously, gas in the die 12 can affect control of the material 20 being translated out of die 12. The inventive die 12 has an array 27 of gas relief apertures 26 at a point removed from the applicator slot 24 to relieve trapped gas 29 from the internal cavity 28.

Figure 2:
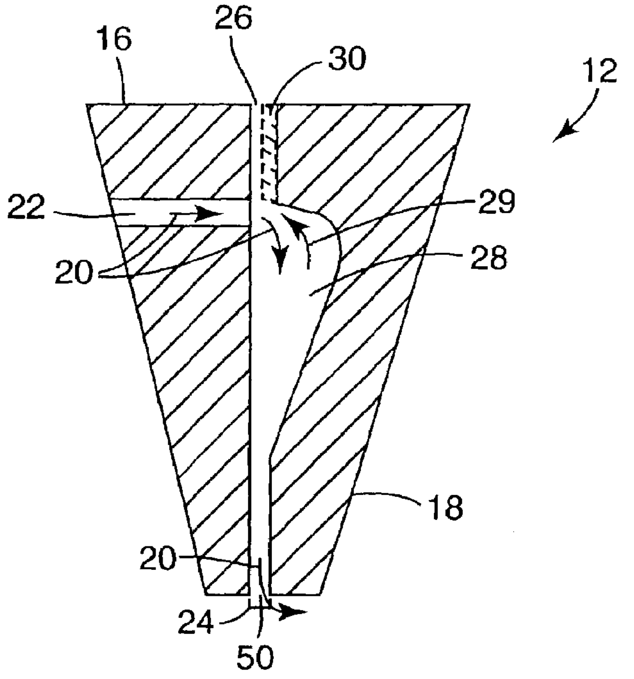
FIG. 2 is a cross-sectional end view of the die as taken along line 2—2 of FIG. 1.

Referring to FIG. 2, a cross-section end view of the coating die 12 of FIG. 1 is illustrated. In the current embodiment, first portion 16 and second portion 18 together define internal cavity 28, which that is in fluid communication with applicator slot 24. Additionally, one gas relief passage 26 is illustrated.

It is desirable that gas relief passages 26 are large enough to readily provide egress to gas trapped in internal cavity 28 to the environment surrounding die 12, but are small enough to prevent the passage of more than a negligible amount of the material 20 being coated (or extruded). The exact dimensions required for the gas relief passages in any particular case depends on such factors as the material being coated, the temperature at which the coating occurs, and the pressure at which the coating material is supplied to the die, but may be determined by various methods (e.g. empirical trials for each case). By choosing the proper gas relief passage size, as well as selecting the material forming the passages, loss of material leaking through the passages after the residual air has been successfully vented, is minimized. The contemplated size of the gas relief passages varies from large (i.e., visible to the naked eye) to small (i.e., not visible to the naked eye). Gas relief passages 26 may be formed in the die 12 in many ways known in the art, including but not limited to cutting or drilling.

One method for determining the appropriate size of gas relief passages 26 is to measure or calculate the operating pressure in the die for the given set of coating conditions (slot height, slot length, slot width, flow rate and viscosity) and then calculate the size the passages such that the flow across the passage due to the effect of the operating pressure is ≦0.001 cc/min. While ≦0.001 cc/min was chosen as one desirable level of flow through passages 26, it should be understood that it is desirable to choose a low enough level of flow across the passages 26 such that it does not significantly affect the total flow through the die slot for the particular coating or extruding application. For example, the level of flow through the passages 26 could be chosen as 0.1% or less of the total coating flow through the die slot.

The pressure drop across a slot due to fluid flow is given by the equation:

$$\Delta P = 12\frac{Q_s \mu L_s}{W_s H_s^3}$$

Where:

$\Delta P$=Die Operating Pressure $Q_s$=Coating Solution Flow Rate $\mu$=Coating Solution Viscosity $L_s$=Length of Coating Slot $W_s$=Width of Coating Slot $H_s$=Height of Coating Slot The pressure drop across each individual passage is given by:

$$\Delta P = 12\frac{Q_p \mu L_p}{W_p H_p^3}$$

Where:

$\Delta P$=Die Operating Pressure $Q_p$=Coating Solution Flow Rate through Gas Passage $\mu$=Coating Solution Viscosity $L_p$=Length of Gas Passage $W_p$=Width of Gas Passage $H_p$=Height of Gas Passage By setting the two equations equal to each other and solving for $W_p H_p^3$, the relative dimensions of the passages can be determined.

It can be seen from the equations that the determination of the size of the passages is independent of the coating solution viscosity. It should be noted that using the above equations is only one method for determining passage size and that other methods known to those skilled in the art may also be used.

It may be convenient to form gas relief passages 26 into one or both portions 16 and 18 of die 12, or optionally it may be convenient to provide the passages on an insert 30 (shown optionally in dotted lines) that is adhered or attached to one or both positions 16 and 18 of die 12. It may be convenient to provide the gas relief passages 26 utilizing insert 30 in order to allow for quick change of the arrangement of gas relief passages 26, such as when there is a change in the material 20 being coated or extruded through die 12.

Figure 3:
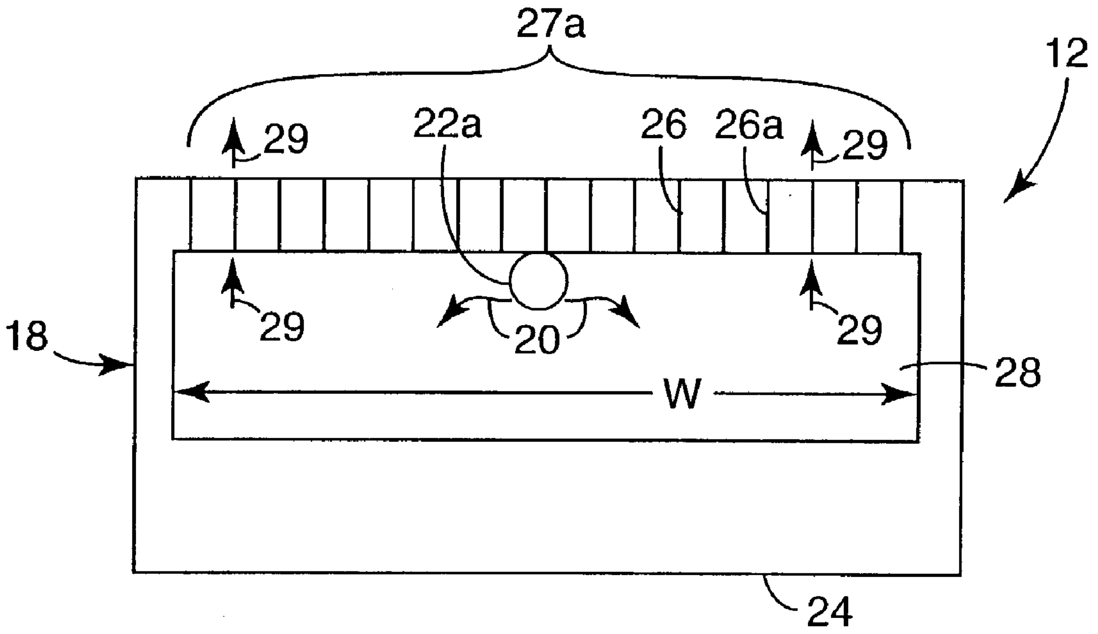
FIG. 3 is a front view of the second portion of the die of FIG. 2 with the first portion of the die removed.

Referring now to FIG. 3, a front view of the second portion 18 of the die 12 of FIG. 2 is illustrated with the first portion 16 of the die 12 removed for clarity. In this embodiment, the plurality of gas relief apertures 26 is array **27*a* of channels 26*a*. Array 27*a* extends across substantially the entire width of the internal cavity 28. Each channel 26*a* extends from internal cavity 28 to the environment surrounding die 12, so as to place internal cavity 28 in communication with the surrounding environment through each channel 26*a*. Array 27 of channels 26*a* ensures that no pockets of gas 29 can remain within the internal cavity 28 without means of egress. As discussed above, channels 26*a* are sized so as to allow egress of gas 29 from internal cavity 28 while substantially preventing egress of material 20. Opening 22*a* illustrates one example of where the supply pipe 22 (see FIG. 1) within the removed first portion 16 would open into the internal cavity 28. Preferably, the top of opening 22*a* is disposed immediately adjacent the plurality of gas passages 26 in order to best achieve air removal from the internal cavity 28. It should be understood that while channels 26*a* are illustrated as being disposed in second portion 18 of die 12, channels 26*a* may be disposed in either or both portions 16 and 18 of die 12, on an insert (e.g., insert 30, shown in FIG. 1**) or may be disposed through a die configuration utilizing any number of portions to form an assembly including a single block.

Figure 4:
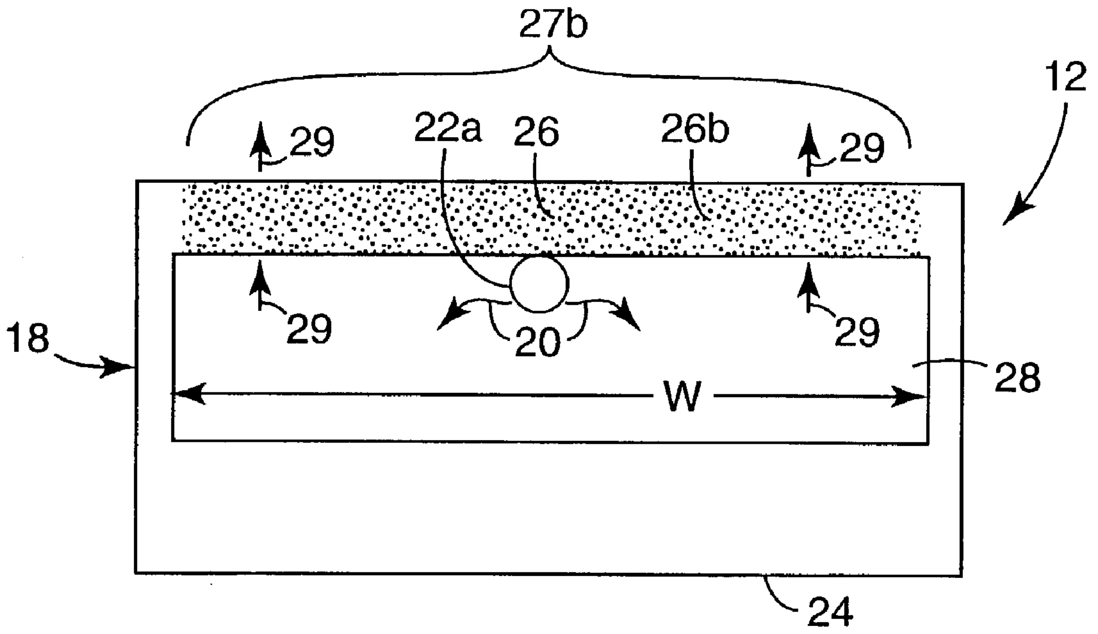
FIG. 4 is an alternate embodiment of the second portion of the die of FIG. 2, with the first portion of the die removed.

Referring now to FIG. 4, an alternate embodiment of the second portion 18 of the die 12 is illustrated, once again with first portion 16 of the die 12 removed for clarity. In this embodiment, a roughened area **27*b* is provided adjacent internal cavity 28. In parallel to the discussion above, this roughened area 27*b* can either be formed on either or both portions 16 and 18 of die 12, or on an insert (e.g., insert 30, shown in FIG. 1) or on a die configuration using any number of portions to form an assembly. The degree of roughness of roughened area 27*b* is calculated to provide interstices 26*b* (on die 12 and/or insert 30) that serve as gas relief passages 26. As discussed above, the sizing of gas relief passages 26 provided by the interstices 26*b* in the roughened area 27*b* should be sufficient to provide egress of gas from the internal cavity 28 to the environment surrounding the die 12, while still preventing the egress of more than a trivial amount of coating material 20 from the internal cavity 28**.

Figure 5:
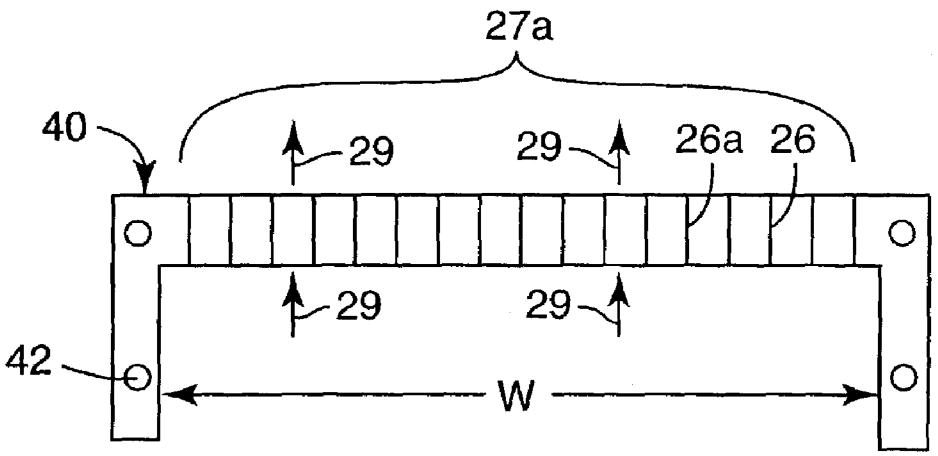
FIG. 5 is a schematic top view of one embodiment of a shim, adapted to be disposed between portions of a die.

Referring now to FIG. 5, a shim 40 is illustrated in front view. Shim 40 is one example of insert 30, discussed previously with respect to FIG. 2 and is adapted to be positioned between the first portion 16 and the second portion 18 of die 12 (see FIGS. 1 and 2). Utilizing shims in extrusion or coating dies is generally known in the art. In this embodiment, array 27$a$ of channels 26$a$ acting as gas relief apertures 26 formed on shim 40. In the art, dies are often assemblies held together by bolts, and so bolt holes 42 are shown in the illustrated embodiment of shim 40 to allow such bolts to pass. Bolting shim 40 in place between first and second portions 16 and 18 provides gas relief apertures 26 sized so as to create passages that allow egress of gas 29 from the die cavity, but do not allow egress of more than a trivial amount of coating (or extruding) material 20 from the die cavity. In this embodiment, the plurality of gas relief apertures extends a distance of about the width of the die cavity 28 (see FIGS. 3 and 4) of the assembled die 12. An advantage of to utilizing shim 40 as part of inventive die 12, is that shim 40 can be retrofitted on existing dies. Additionally, when the material being extruded or coated by the die is varied, the shim can be removed and a different shim having different dimensions of channels 26$a$ can be substituted to allow egress of gas 29, while substantially preventing egress of the coated or extruded material 29.

Figure 6:
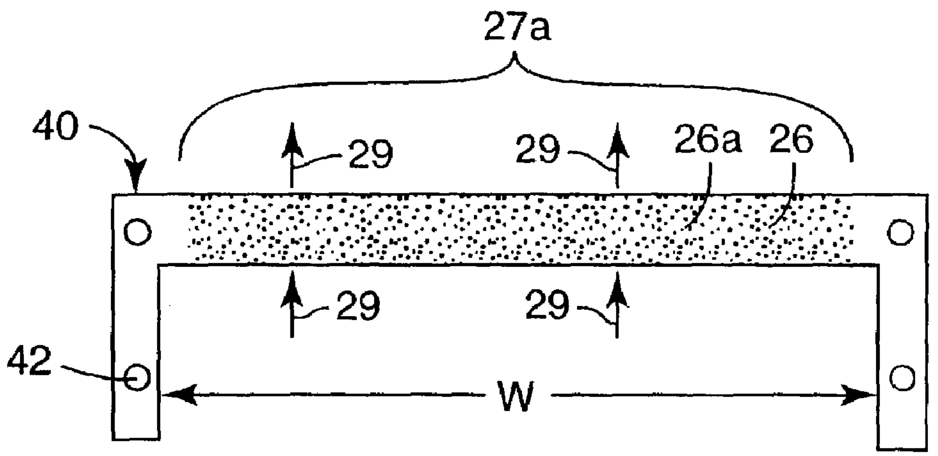
FIG. 6 is a schematic top view of a second embodiment of a shim, adapted to be disposed between portions of a die.

In FIG. 6, an alternate embodiment of shim 40 is illustrated. In the illustrated embodiment, a roughened area 27$b$ having interstices 26$b$ is provided on shim 40. Thus, when shim 40 is bolted in place between first and second portions 16 and 18 of die 12 (see FIGS. 1 and 2), the interstices 26$b$ in roughened area 27$b$ provide gas relief passages 26 sufficient to provide egress to gas in the die cavity, but substantially preventing egress of coating (or extruding) material from the die cavity. As discussed in Example 2 below, a material having a roughened surface may be secured to shim 40 to provide roughened aread 27$b$. Alternatively, roughened area 27$b$ may be formed directly in the material forming shim 40. It should be noted that roughening the surface can be accomplished using conventional means known to those skilled in the art.

The present invention addresses the disadvantages inherent in the devices described above by providing practical designs for dies having multiple routes for residual gas to escape, even when the die must be oriented in a vertical direction. In one respect, the invention can be thought of as a die including a die body having a cavity therein, wherein the cavity is in fluid communication with an applicator slot. A plurality of gas relief apertures are present in fluid communication with the cavity at positions in the cavity removed from the applicator slot.

In a second respect, the invention can be thought of as a method of applying a material to a substrate.

A die comprising a die body having a cavity therein is provided. Wherein the cavity is in fluid communication with an applicator slot.

A plurality of gas relief apertures, in fluid communication with the cavity are present in the die. The gas relief apertures are disposed at positions in the cavity removed from the applicator slot.

The die is oriented with the applicator slot generally downwards above the substrate.

Material is then introduced into the die cavity such that the material is dispensed onto the substrate through the applicator slot and such that residual air within the die cavity is vented through the plurality of gas relief apertures.

As mentioned above, various embodiments of the invention are possible. It is to be understood that the above description is intended to be illustrative, and not restrictive. Workers skilled in the art will recognize that changes may be made in form and detail without departing from the spirit and scope of the invention.

Examples illustrating the use of the present invention are described below:

EXAMPLE 1

A coating die of generally conventional construction was prepared having a first and a second portion, together defining a die cavity communicating with an applicator slot about 5 inches (12.5 cm) long. The second die portion had a connection to a feed pipe and was constructed from steel. The first die portion was constructed from transparent acrylic polymer so that the die cavity could be seen during coating. The first and second portions were provided with bolt holes for assembly together to form the coating die. A shim (as generally depicted in FIG. 5) was fabricated from stainless steel plate having a thickness of about 0.01 inch (0.25 mm). Multiple gas relief passages were milled onto one of the surfaces of the shim (again as generally depicted in FIG. 5). These gas relief passages were each about 0.01 inch (0.25 mm) wide, about 0.002 inch (0.05 mm) deep, and separated from each other by a distance of about 0.0625 inch (1.59 mm). These passage sizes were calculated using the equations previously described.

The pressure in the die for the given set of coating conditions (slot height, slot length, slot width, flow rate and viscosity) was calculated, and then the size of the passages were determined such that the flow across the passage due to the effect of the operating pressure is ≦0.001 cc/min.

The pressure drop across a slot due to fluid flow was determined.

$$\Delta P = 12\frac{Q_s \mu L_s}{W_s H_s^3}$$

Where:

ΔP=Die Operating Pressure $Q_s$=Coating Solution Flow Rate

μ=Coating Solution Viscosity $L_s$=Length of Coating Slot $W_s$=Width of Coating Slot $H_s$=Height of Coating Slot The pressure drop across each individual passage is given by:

$$\Delta P = 12\frac{Q_p \mu L_p}{W_p H_p^3}$$

Where:

ΔP=Die Operating Pressure $Q_p$=Coating Solution Flow Rate through Gas Passage

μ=Coating Solution Viscosity $L_p$=Length of Gas Passage $W_p$=Width of Gas Passage $H_p$=Height of Gas Passage For this example, a passage width of 0.01 inch (0.25 mm) was desired for machining purposes, the passage length was set by the existing die geometry at 1.5 inch (3.81 cm) and the coating solution flow rate was 62.5 cc/min. $Q_p$ was set to be 0.001 cc/min. The passage depth required was then calculated to be:

$$H_p = \sqrt[3]{\left[\frac{W_s H_s^3}{Q_s L_s}\right]\left[\frac{Q_P L_P}{W_P}\right]}$$

$$H_p = 0.002 \text{ inch } (0.05 \text{ mm})$$

The coating die was assembled using bolts with the described shim between the first and second portions such that the exit of the feed pipe was immediately below the level of the gas relief passages. The die slot was sealed closed and the die was filled with coating material. The die slot was sealed closed to allow the die cavity to be filled without any leakage of the coating material.

The coating die was set up for die coating with the gas relief passages oriented upwards and the applicator slot oriented downwards. The coating die was then used to coat a solution of glycerin and water at room temperature, having a viscosity of about 30 centipoises, onto a moving substrate. The pressure in the die cavity was about 0.33 psi (2.3 kPa). As the coating material was introduced into the coating die, it could be seen through the transparent portion of the die that air within the die cavity was displaced upwards and successfully vented through the gas relief passages. This complete filling was verified by opening the die to reveal the cavity to view the location of the liquid air interface (the "wetted" surface) in the cavity. Viewing the die cavity revealed that the air within the cavity was vented and only a negligible amount of coating material was lost through the gas relief passages.

EXAMPLE 2

A coating die of generally conventional construction was prepared having a first and a second portion, both formed from steel, together defining a die cavity communicating with an applicator slot about 4 inches (10.16 cm) long. The second die portion had a connection to a feed pipe. The first and second portions were provided with bolt holes for assembly together to form the coating die. A shim (as generally depicted in FIG. 6) was fabricated from stainless steel plate having a thickness of about 0.04 inch (1.0 mm). Multiple gas relief passages were formed onto one of the surfaces of the shim (again as generally depicted in FIG. 6). These gas relief passages were formed by mounting 240 grit sandpaper (approximately 60 micrometer roughness) to the surface of the shim.

The coating die was assembled using bolts with the described shim between the first and second portions such that the exit of the feed pipe was immediately below the level of the gas relief passages. The die slot was sealed closed and the die was filled with water at room temperature, having a viscosity of about 1 centipoise (coating material). The die slot was sealed closed to allow the die cavity to be filled without any leakage of the coating material. The coating die was set up for die coating with the gas relief passages oriented upwards and the applicator slot oriented downwards. The pressure in the die cavity was about 0.1 psi (0.69 kPa). After the coating die was filled, the front of the die was removed and complete filling of the internal cavity was verified by opening the die to reveal the cavity and view the location of the liquid air interface (the "wetted" surface) in the cavity, as indicated by the blue dye. Viewing the die cavity revealed that the air within the cavity was vented as the water had entered into the channels between the sandpaper grit. Additionally, coating material was not lost through the gas relief passages to the environment surrounding the die.

The invention claimed is:

1. A method of applying a material to a substrate, comprising the steps of:

providing a die comprising a die body having an internal cavity and an applicator slot in fluid communication with the internal cavity, in a position separate from the applicator slot and a plurality of gas relief apertures present in fluid communication with the cavity;

introducing the material into the internal cavity such that the material is dispensed onto the substrate through the applicator slot;

orienting the die such that the applicator slot is disposed generally downwards above the substrate; and venting air within the die cavity through the plurality of gas relief apertures wherein the gas relief apertures are formed by a plurality of interstices disposed in a roughened area.

2. A method of applying a material to a substrate, comprising the steps of:

providing a die comprising a die body having an internal cavity and an applicator slot in fluid communication with the internal cavity, wherein the die body is formed by a first portion and a second portion, such that the first portion and the second portion together define the cavity, wherein the die includes a shim disposed between the first portion and the second portion in a position separate from the applicator slot and a plurality of gas relief apertures present in fluid communication with the cavity and additionally wherein the plurality of gas relief apertures are formed within the shim;

introducing the material into the internal cavity such that the material is dispensed onto the substrate through the applicator slot;

orienting the die such that the applicator slot is disposed generally downwards above the substrate; and venting air within the die cavity through the plurality of gas relief apertures.

3. A method of applying a material to a substrate, comprising the steps of:

providing a die comprising a die body having an internal cavity and an applicator slot in fluid communication with the internal cavity, in a position separate from the applicator slot wherein the die body is formed by a first portion and a second portion, such that the first portion and the second portion together define the cavity, wherein the die includes a shim disposed between the first portion and the second portion in a position separate from the applicator slot and a plurality of gas relief apertures present in fluid communication with the cavity and additionally wherein the plurality of gas relief apertures are formed within the shim, wherein the gas relief passages we formed by a plurality of channels;

introducing the material into the internal cavity such that the material is dispensed onto the substrate through the applicator slot;

orienting the die such that the applicator slot is disposed generally downwards above the substrate; and venting air within the die cavity through the plurality of gas relief apertures.

4. A method of applying a material to a substrate, comprising the steps of:

providing a die comprising a die body having an internal cavity and an applicator slot in fluid communication with the internal cavity, wherein the die body is formed by a first portion and a second portion, such that the first portion and the second portion together define the cavity, and a plurality of gas relief apertures present in fluid communication with the cavity in a position separate from the applicator slot wherein the gas relief apertures are formed by a plurality of interstices disposed in a roughened area;

introducing the material into the internal cavity such that the material is dispensed onto the substrate through the applicator slot;

orienting the die such that the applicator slot is disposed generally downwards above the substrate; and venting air within the die cavity through the plurality of gas relief apertures.

5. A die, comprising:

a die body defining an at least one internal cavity, and an applicator slot wherein the cavity is in fluid communication with the applicator slot; and a plurality of gas relief passages in fluid communication with the internal cavity, wherein the gas relief passages further comprise:

a plurality of interstices, disposed at least partially in a roughened area.

6. A die, comprising:

a die body defining an at least one internal cavity, and an applicator slot wherein the cavity is in fluid communication with the applicator slot; and a plurality of gas relief passages in fluid communication with the internal cavity, in a position separate from the applicator slot wherein the plurality of gas relief passages extend across substantially the entire width of the cavity, wherein the gas relief passages further comprise:

a plurality of interstices disposed in a roughened area.

7. A die, comprising:

a die body defining an at least one internal cavity, and an applicator slot wherein the cavity is in fluid communication with the applicator slot, wherein the die body comprises:

a first portion and a second portion, such that the first portion and the second portion together define the cavity; and a plurality of gas relief passages in fluid communication with the internal cavity, wherein the die further comprises:

a shim disposed between the first portion and the second portion in a position separate from the applicator slot, wherein the plurality of gas relief passages are formed at least partially within the shim.

* * * * *

UNITED STATES PATENT AND TRADEMARK OFFICE

CERTIFICATE OF CORRECTION

PATENT NO. : 7,083,826 B2
APPLICATION NO. : 10/439448
DATED : August 1, 2006
INVENTOR(S) : Mikhail L. Pekurovsky et al.

It is certified that error appears in the above-identified patent and that said Letters Patent is hereby corrected as shown below:

Column 1
Line 64, delete “DRAWING” and insert -- DRAWINGS --, therefor.

Column 5
Line 31, delete “aread” and insert -- area --, therefor.

Column 8
Lines 12-13, in Claim 1, after “cavity” delete “in a position separate from the applicator slot”.

Line 14, in Claim 1, delete “cavity,” and insert -- cavity in a position separate from the applicator slot; --, therefor.

Line 33, in Claim 2, delete “and” and insert -- , and --, therefor.

Lines 49-50, in Claim 3, after “cavity,” delete “in a position separate from the applicator slot”.

Line 55, in Claim 3, delete “and” and insert -- , and --, therefor.

Line 59, in Claim 3, delete “we” and insert -- are --, therefor.

Column 9
Line 10, in Claim 4, delete “wherein” and insert -- , wherein --, therefor.

Line 25, in Claim 5, delete “cavity,” and insert -- cavity in a position separate from the applicator slot, --, therefor.

UNITED STATES PATENT AND TRADEMARK OFFICE
CERTIFICATE OF CORRECTION

PATENT NO. : 7,083,826 B2
APPLICATION NO. : 10/439448
DATED : August 1, 2006
INVENTOR(S) : Mikhail L. Pekurovsky et al.

It is certified that error appears in the above-identified patent and that said Letters Patent is hereby corrected as shown below:

Column 10
Lines 6-7, in Claim 6, delete "cavity, in" and insert -- cavity in, --, therefor.

Signed and Sealed this

Tenth Day of July, 2007

JON W. DUDAS
*Director of the United States Patent and Trademark Office*